US012757069B2

(12) United States Patent
Wang et al.

(10) Patent No.: US 12,757,069 B2
(45) Date of Patent: Oct. 6, 2026

(54) SWITCHING MECHANISM FOR DYNAMIC MULTICAST OPTIMIZATION

(71) Applicant: Hewlett Packard Enterprise Development LP, Spring, TX (US)

(72) Inventors: Zhenlei Wang, Beijing (CN); Xuguang Jia, Beijing (CN); Jianpo Han, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 281 days.

(21) Appl. No.: 18/392,710

(22) Filed: Dec. 21, 2023

(65) Prior Publication Data

US 2025/0212056 A1 Jun. 26, 2025

(51) Int. Cl.

| | |
|---|---|
| ***H04W 28/06*** | (2009.01) |
| ***H04W 4/06*** | (2009.01) |
| ***H04W 76/40*** | (2018.01) |

(52) U.S. Cl.

CPC ............. *H04W 28/06* (2013.01); *H04W 4/06* (2013.01); *H04W 76/40* (2018.02)

(58) Field of Classification Search

None

See application file for complete search history.

(56) References Cited

U.S. PATENT DOCUMENTS

| | | | | |
|---|---|---|---|---|
| 2006/0048034 A1* | 3/2006 | Cho | H04L 1/1614 714/749 |
| 2006/0092871 A1* | 5/2006 | Nishibayashi | H04L 1/188 370/477 |

(Continued)

FOREIGN PATENT DOCUMENTS

| | | | |
|---|---|---|---|
| CN | 108616334 A * | 10/2018 | H04N 21/6405 |
| KR | 20110012088 A * | 2/2011 | H04W 72/30 |

(Continued)

OTHER PUBLICATIONS

Kalkal, M., et al. “Neural Activity During Anticipation of Feared Social Situations in Social Anxiety Disorder.” arXiv, Sep. 13, 2017, arxiv.org/abs/1709.04818.*

(Continued)

*Primary Examiner* — Andrew C Oh

(74) *Attorney, Agent, or Firm* — Hewlett Packard Enterprise Patent Department

(57) ABSTRACT

In implementations of the present disclosure, a switching mechanism for dynamic multicast optimization (DMO) feature is provided. An access point (AP) multi-link device (MLD) determines an average rate for downlink (DL) traffic to a plurality of stations (STAs) on a link, a first index based on a number of the STAs on the link, an average length of non-unicast (UC) frames, the average rate and a predetermined parameter and a second index based on the average length of non-UC frames and a basic rate for the STAs on the link. The AP MLD compares the first index and the second index, and triggers the DMO based on the comparison of the first index and the second index. Implementations of the present disclosure can improve channel utilization. In some implementations, it can reduce the number of missed frames for multi-link single radio (MLSR) cases and reduce broadcast or multicast latency.

18 Claims, 8 Drawing Sheets

(56) References Cited

U.S. PATENT DOCUMENTS

2011/0096712 A1* 4/2011 Kish ........................ H04L 45/16 370/312
2013/0021997 A1* 1/2013 Lee ................... H04W 74/0841 370/329
2013/0336319 A1* 12/2013 Liu ........................ H04L 65/611 370/390
2014/0140232 A1* 5/2014 Dayanandan ......... H04W 84/12 370/252
2014/0274101 A1* 9/2014 Venkatesan ....... H04W 28/0864 455/453
2016/0081106 A1* 3/2016 Zhou ..................... H04W 24/10 370/328
2020/0396568 A1 12/2020 Huang et al.
2021/0185607 A1 6/2021 Cariou et al.
2021/0266137 A1* 8/2021 Monajemi ............. H04L 5/0096
2021/0274574 A1 9/2021 Ghosh et al.
2021/0337613 A1 10/2021 Seok et al.
2021/0377856 A1 12/2021 Chu et al.
2021/0385692 A1 12/2021 Kwon et al.
2022/0060927 A1* 2/2022 Kota ................. H04W 28/0268
2022/0337338 A1 10/2022 Homchaudhuri et al.
2023/0147839 A1* 5/2023 Dong .................... H04L 1/1678 370/329

FOREIGN PATENT DOCUMENTS

WO 2021/244652 A1 12/2021
WO 2022/022390 A1 2/2022
WO 2022/108021 A1 5/2022

OTHER PUBLICATIONS

Pavon, Jd.P. & Choi, Sunghyun. (2003). Link adaptation strategy for IEEE 802.11 WLAN via received signal strength measurement. 1108-1113 vol. 2. 10.1109/ICC.2003.1204534.*

* cited by examiner

SWITCHING MECHANISM FOR DYNAMIC MULTICAST OPTIMIZATION

BACKGROUND

In the field of Wi-Fi, Wi-Fi 7 (e.g., Institute of Electrical and Electronics Engineers (IEEE) 802.11be) is a Wi-Fi standard, which can improve the wireless experience and accelerate emerging use cases. A multi-link operation (MLO) technology uses Wi-Fi technology that enables a station (STA) (such as a smartphone) connected to an access point (AP) to simultaneously send and/or receive data across different frequency bands and channels. It can help enhance the user experience by handling wireless connections more efficiently. Both the AP and the STA need to support Wi-Fi 7 and MLO so as to use this feature. The MLO enables multi-link devices (MLDs) to connect to multiple Wi-Fi bands at the same time (such as 2.4 gigahertz (GHz), 5 GHZ, and 6 GHz).

Dynamic multicast optimization (DMO) in Wi-Fi 7 is a feature that optimizes multicast communication. Multicast communication is the transmission of data from one source to multiple clients, commonly used for applications such as video conferencing, online education, streaming media, and so on. DMO dynamically adjusts the parameters of multicast transmission to optimize the performance of multicast communication. It detects changes in multicast traffic and dynamically adjusts multicast rates and transmission power based on network conditions and user needs. This dynamic adjustment ensures that multicast traffic can achieve a better performance under various network conditions. DMO also selects the optimal multicast rate and transmission power based on clients' capabilities and location. This ensures that each device can receive a clear signal and achieve better network performance.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
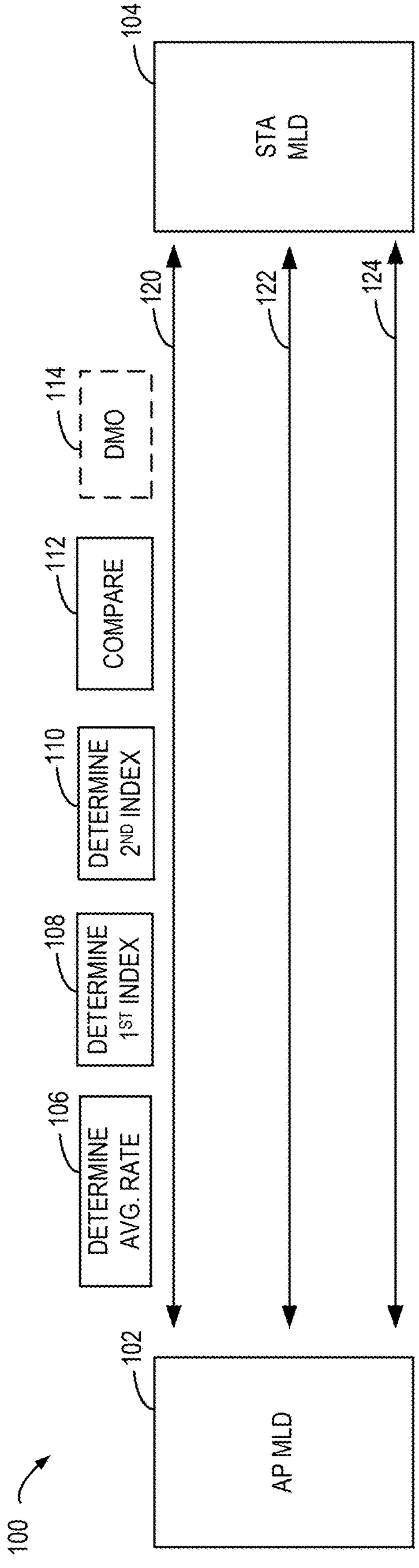
FIG. 1 illustrates an example network environment in which example implementations of the present disclosure may be implemented.

In previous Wi-Fi generations, for example, Wi-Fi 5 and Wi-Fi 6, a device can only connect to one Wi-Fi band at a time, e.g., either the 2.4 GHz band or the 5 GHz band. Some later products (such as Wi-Fi 6E products) can also connect to the 6 GHz band but can still only connect to one Wi-Fi band at a time. For example, a typical Wi-Fi 6 AP or router operates on 2.4 GHz and 5 GHz bands, but a smartphone can only connect to it using one of the two bands (2.4 GHz or 5 GHz) at a time. This means that the other one of the two bands will not be used, or the networking speed will be affected by choosing the slower band.

Wi-Fi 7 with the MLO technology can aggregate multiple channels on different frequency bands at the same time, which can negotiate seamless network traffic even if there is interference or congestion. With the MLO, Wi-Fi 7 can establish multiple links between a station or a client (such as a smartphone) and the Wi-Fi network devices (such as an AP or a router). Connecting to the 2.4 GHz, 5 GHz, and/or 6 GHz bands simultaneously can increase the throughput, reduce the latency, and improve reliability. It is ideal for emerging applications like virtual reality or augmented reality, online gaming, remote office, and cloud computing. It is to be understood that both the access point and client device need to support Wi-Fi 7 and MLO to use this feature. Only for the purpose of brevity, an AP, an STA, and a client in the present disclosure hereafter be referred to as an MLD, which supports the MLO feature if there is no contrary description. For example, an access point hereafter may be referred to as an AP MLD, which supports the MLO feature.

Hence, the MLO is a major feature introduced in Wi-Fi 7. It enables devices to exchange frames over multiple links. The MLO enables a non-AP MLD to discover, authenticate, associate, and set up multiple links with an AP MLD. Each link enables channel access and frame exchanges between the non-AP MLD and the AP MLD based on the supported capabilities exchanged during association. BC/MC frames are usually sent at DTIM time. If an STA is under a power save state, the AP MLD will send BC/MC frames on each link with the same sequence number because each link may have non-MLD STAs. However, the STA MLD will receive multiple (for example, a number of MLO links) identical BC/MC frames, and discard the redundant frames based on the sequence number in IEEE 802.11 header and TSF information. This is a waste of time for STA MLD transmissions and receptions, as well as a waste of channel resources when the AP MLD connects to STA MLDs. Further, a BC/MC frames missing issue may happen if STA MLDs have link switching or changing among MLD links.

For non-extremely high throughput (non-EHT) MLD, if the DMO feature is enabled, the BC/MC frames will be converted to unicast frames for specific multicast client groups to ensure that all clients can receive them. However, in some cases, this feature will result in a worse Wi-Fi radio condition. Further, in the case that a well-scheduled DTIM transmissions scheme on the MLD links is absent, it needs a change to meet high latency for BC/MC frames. Therefore, there's a need to consider additional DMO trigger conditions on a single link for an MLD device.

Therefore, implementations of the present disclosure propose a switching mechanism for the DMO feature. Generally, an AP MLD determines an average rate for downlink (DL) traffic to a plurality of STAs on a link. The AP MLD determines a first index based on a number of the STAs on the link, an average length of non-unicast (UC) frames, the average rate, and a predetermined parameter. The AP MLD determines a second index based on the average length of non-unicast (UC) frames and a basic rate for the STAs on the link. The AP MLD compares the first index and the second index, and the AP MLD triggers the DMO based on the comparison of the first index and the second index.

According to implementations of the present disclosure, after a multicast packet is converted into unicast packets, the transmission (TX) rate of a unicast packet is much higher than that of a multicast packet. If the sum of the TX times of all unicast packets is greater than that of multicast packets, the DMO will be turned off. By turning off the DMO, it will result in higher channel utilization. Otherwise, the DMO is turned on. In this way, a solution for tuning the DMO feature for BC or MC on a single link is introduced. Implementations of the present disclosure can improve channel utilization. In some implementations, it can reduce the number of missed frames for MLSR cases and reduce BC or MC latency.

The advantages of implementations of the present disclosure will be described with reference to example implementations as described below. Reference is made below to FIG. 1 through FIG. 8 to illustrate basic principles and several example implementations of the present disclosure herein.

Reference is made to FIG. 1, which illustrates an example network environment 100 in which example implementations of the present disclosure may be implemented. As shown in FIG. 1, the network environment 100 comprises an AP MLD 102 and an STA MLD 104. The AP MLD 102 may operate on the 2.4 GHz band. The AP MLD 102 may further operate on the 5 GHz band. The AP MLD 102 may further operate on the 6 GHz band. The STA MLD 104 may operate on the 2.4 GHz band. The STA MLD 104 may further operate on the 5 GHz band and the 6 GHz band, as well as the AP MLD 102.

The network environment 100 further comprises three links between the AP MLD 102 and the STA MLD 104. These three links may include a link 120, a link 122, and a link 124, as shown in FIG. 1. In some example implementations, the link 120 may be referred to a link on 2.4 GHz band, the link 122 may be referred to a link on 5 GHz band, and link 124 may be referred to a link on 6 GHz band. However, it is to be understood that the number and order of the links is not limited to what they are shown in FIG. 1. It is to be understood that for the purpose of simplification, the term "link" and the term "band" may be used interchangeably throughout the present disclosure.

In the network environment 100, the STA MLD 104 may be a multi-link multi-radio device, which means it can receive or transmit frames via multiple links at the same time. The STA MLD 104 may also be a multi-link single radio (MLSR) device, which means it has multiple links, but it receives or transmits frames on a single link at a time. In general, a normal legacy non-EHT client, an extremely high throughput MLSR (EMLSR) device, and an MLSR device may be treated as a single link STA throughout the present disclosure.

As shown in FIG. 1, the AP MLD 102 is working on the link 120. The STA MLD 104 may be treated as a single link STA. Therefore, the AP MLD 102 may need to convert the BC or MC frames to UC frames because the DMO may be performed. However, the AP MLD 102 does not know whether to trigger the DMO at this moment. By implementations of the present disclosure, the AP MLD 102 may determine whether to trigger the DMO. For example, the AP MLD 102 may assume that all BC or MC frames follow an average distribution. The AP MLD 102 may determine (106) an average rate for downlink (DL) traffic to on the link 120. It is to be understood that there may be other STAs connected via the link 120, which are not shown in FIG. 1.

The AP MLD 102 may further determine (108) a first index. The first index may be determined based on a number of the STAs on the link, an average length of non-UC frames, the average rate, and a predetermined parameter. In some example implementations, the predetermined parameter may be associated with a first amount of time indicating that UC frames are transmitted using single user (SU) transmission TX flow. In some example implementations, the predetermined parameter may be associated with a second amount of time, indicating that UC frames are transmitted using multiple-input, multiple-output (MIMO), or orthogonal frequency-division multiple access (OFDMA) TX flow. In some example implementations, the predetermined parameter may be associated with both the first amount of time and the second amount of time.

The AP MLD 102 may determine (110) a second index. The second index may be determined based on the average length of non-UC frames and a basic rate for the STAs on the link 120. For example, assuming there are two STAs connected to the link 120, where one is the STA MLD 104 and the other one is not shown. The basic rate for the STA MLD 104 is N1, and the basic rate for the other STA MLD is N2. If N1 is less than N2, then the basic rate for the STAs on the link 120 is N1.

The AP MLD 102 may compare (112) the first index and the second index, and the AP MLD 102 may trigger (114) the DMO based on the comparison of the first index and the second index. For example, if the first index is less than the second index, the AP MLD is going to the perform the DMO on the link 120. If the first index is greater than or equal to the second index, the AP MLD will not perform the DMO on the link 120.

In this way, a multicast packet is assumed to be converted into unicast packets. Because the TX rate of a unicast packet is much higher than that of a multicast packet, when the sum of the TX times of all unicast packets is greater than that of multicast packets, the DMO will be turned off. This will reduce the number of missed frames for MLSR cases, and improve the channel utilization. In some implementations, it can reduce broadcast or multicast latency. Otherwise, if the sum of the TX times of all unicast packets is less than that of multicast packets, the DMO is turned on.

It is to be understood that in FIG. 1 and throughout the present disclosure, the number of any elements is only for the purpose of illustration without suggesting any limitations. The network environment 100 may comprise more or fewer links, and the AP MLD 102 and the STA MLD 104 may support more links as Wi-Fi technology develops in the future.

Figure 2:
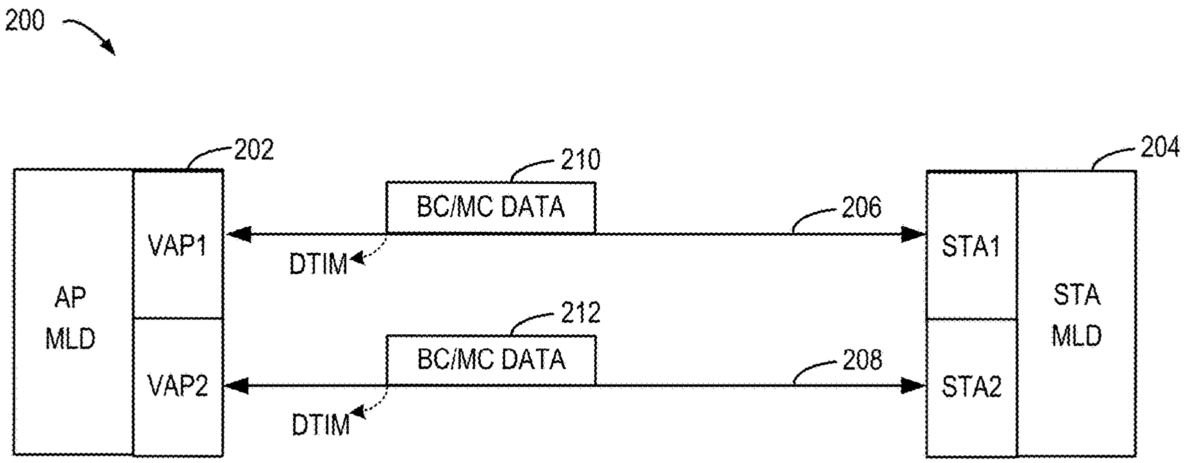
FIG. 2 illustrates an example architecture of an AP MLD and an STA MLD according to implementations of the present disclosure.

Reference is made to FIG. 2, which illustrates an example architecture 200 of an AP MLD and an STA MLD according to implementations of the present disclosure. As shown in FIG. 2, the architecture 200 comprises an AP MLD 202 and an STA MLD 204. The AP MLD 202 in FIG. 2 may correspond to the AP MLD 102 in FIG. 1. The STA MLD 204 in FIG. 2 may correspond to the STA MLD 104 in FIG. 1. A virtual AP (referred to as VAP 1) of the AP MLD 202 is connected to an STA (referred to as STA 1) of the STA MLD 204 via a link 206. A virtual AP (referred to as VAP 2) of the AP MLD 202 is connected to an STA (referred to as STA 2) of the STA MLD 204 via a link 208.

On the link 206, BC or MC data frame 210 will be sent right after a DTIM. On the link 208, BC or MC data frame 212 will be sent right after a DTIM. DTIM is a message used in Wi-Fi networks to indicate the presence of delivery traffic. It is a timer that informs other users in the network about the arrival of broadcast and multicast data. When a DTIM is received, an AP sends all buffered multicast data at once, providing an efficient mechanism for power saving. By default, every beacon frame is a DTIM. If DTIM=m is configured, it means that the AP will transmit buffered multicast data every m beacon frame.

Assuming a case that the STA MLD 204 is in a power save state, the AP MLD 202 will send the BC or MC frames on each link with the same sequence number because each link may correspond to a non-MLD STA. For the STA MLD 204, it will receive multiple identical BC or MC frames (such as BC or MC data frame 210 and BC or MC data frame 212), and discard the redundant frames based on the sequence number in 802.11 header and TSF information. This is a waste of time for STA MLD as well as a waste of channel resources.

Figure 3:
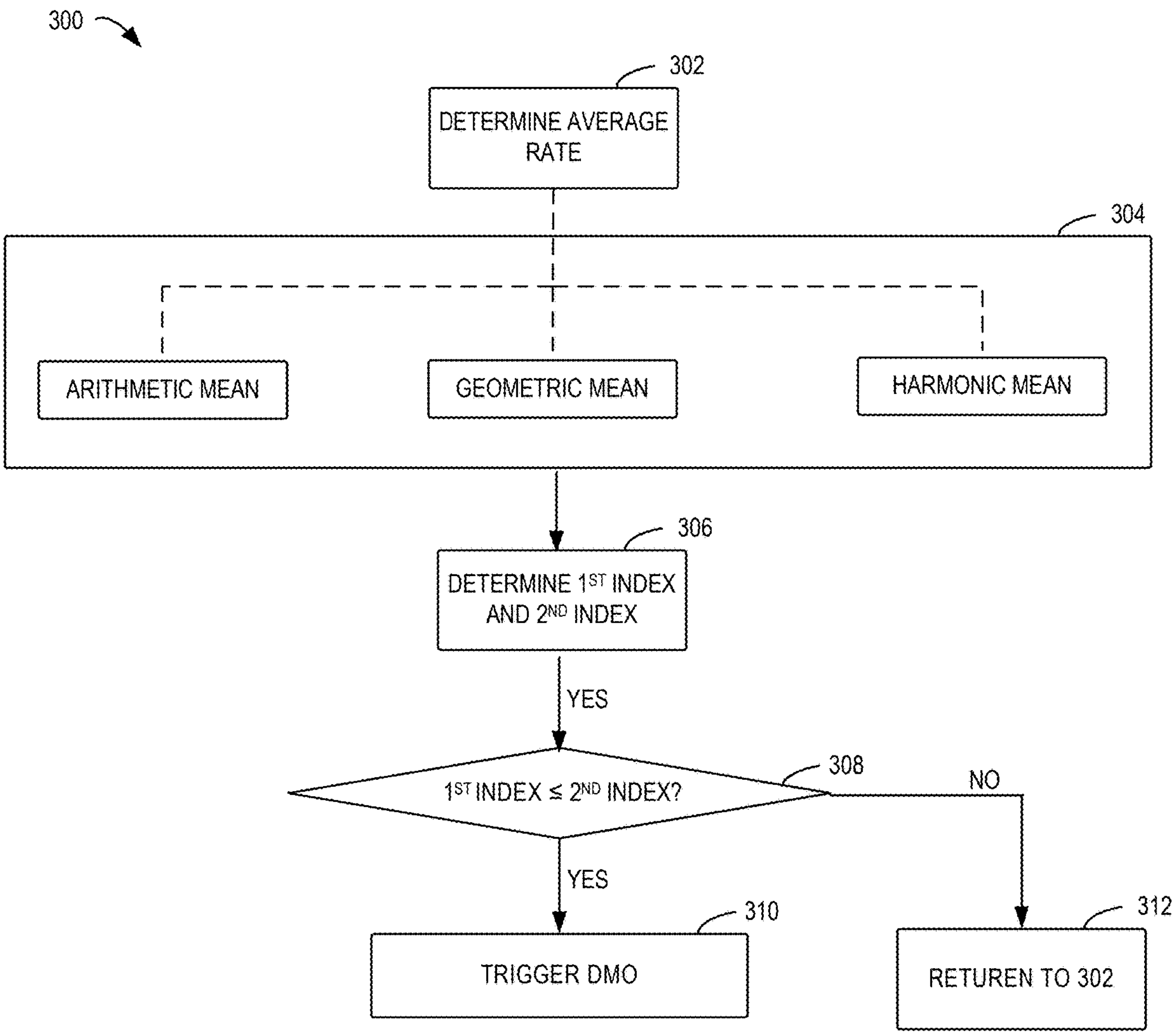
FIG. 3 illustrates an example flow chart of a process for triggering a DMO on a link according to implementations of the present disclosure.

Reference is made to FIG. 3, which illustrates an example flow chart of a process 300 for triggering a DMO on a link according to implementations of the present disclosure. FIG. 3 will be described in combination with FIG. 1 thereafter. In FIG. 3, the AP MLD is or is treated as an MLSR device. At block 302, the AP MLD 102 may determine an average rate. The average rate may be represented as $R_{mean}$. $R_{mean}$ may be used to describe the rate mean value for the DL traffic to different clients (such as STAs). There may be three different rate means, as shown in block 304.

In some example implementations, the $R_{mean}$ may be determined using an arithmetic mean. The calculation of the arithmetic mean may be determined by formula (1) as follows:

$$R_{mean} = \frac{R_{c1} + R_{c2} + \ldots + R_{cn}}{N_{client}} \quad (1)$$

where $R_{cn}$ may represent the rate for client N; $N_{client}$ may represent the total number of clients.

In some example implementations, the $R_{mean}$ may be determined using a geometric mean. The calculation of the arithmetic mean may be determined by formula (2) as follows:

$$R_{mean} = \sqrt[N_{client}]{R_{c1} R_{c2} \ldots R_{cn}} \quad (2)$$

where $R_{cn}$ may represent the rate for client N; $N_{client}$ may represent the total number of clients.

In some example implementations, the $R_{mean}$ may be determined using a harmonic mean. The calculation of the arithmetic mean may be determined by formula (3) as follows:

$$R_{mean} = \frac{N_{client}}{\frac{1}{R_{c1}} + \frac{1}{R_{c2}} + \ldots + \frac{1}{R_{n}}} \quad (3)$$

where $R_{cn}$ may represent the rate for client N; $N_{client}$ may represent the total number of clients.

The pros and cons of using different alternatives to calculate the average rate may be as follows: the arithmetic mean rate calculates the average rate by summing up all the physical (PHY) layer rates and dividing them by the number of clients. It provides a simple and intuitive representation of the average rate. However, it does not consider the relative ratios between rates and can be influenced by extreme values. If there are clients with significantly higher or lower rates, the arithmetic mean can be skewed towards those extreme values. Thus, it is suggested to use this arithmetic mean rate if it has similar values for clients' PHY capability, range to AP side, received signal strength indicator (RSSI), etc.

On the other hand, the geometric mean rate takes into account the multiplicative relationship between rates and represents a measure of the central tendency of the rates. The geometric mean is useful when the rates exhibit exponential or multiplicative behavior. It is less affected by extreme values compared to the arithmetic Mean, and the geometric mean provides a more balanced representation of the rates. Thus, it is suggested that using the geometric mean if most clients are close to each other and form a cluster group to AP and concern the radio band overall load.

For the harmonic mean rate, it is particularly suitable for the averaging rates that have a reciprocal relationship, such as time or speed. The harmonic mean gives more weight to lower rates, which emphasizes the contribution of slower clients. It is less affected by outliers compared to the arithmetic mean but can underestimate the overall rate if there are clients with very low rates. Thus, it is suggested to use the harmonic mean rate if clients' rates vary greatly, especially for factors that include basic rate, bandwidth (BW), network service set (NSS), and puncture-supported status.

It is to be understood that the choice of different rate means may depend on the specific context and the desired interpretation of the average rates in the given Wi-Fi networking. The above description is only examples but not limitation.

At block 306, the AP MLD 102 may determine a first index and a second index. In some example implementations, the first index may be introduced to help to determine the TX rate if all BC or MC frames are converted to UC frames. The first index may be determined by formula (4) as follows:

$$N_{client}\left(\frac{L_{non-UC}}{R_{mean}} + \alpha\right) \quad (4)$$

where $R_{mean}$ may represent the average rate determined with one of formulas (1) to (3); $N_{client}$ may represent the total number of clients; $L_{non-UC}$ may represent the average length of BC or MC frames; and a may represent a predetermined parameter.

In some example implementations, a may be an extra time beyond the data payload time usage. It can be variable for different traffic flow selections, for example, a may be associated with an amount of time indicating that UC frames are transmitted using SU TX flow, which may be represented by formula (5) as follows:

$$SIFS+ACK \quad (5)$$

where SIFS may represent the time length for short inter frame space (SIFS); and ACK may represent the time length for receiving an acknowledgement (ACK).

In some example implementations, a may be associated with an amount of time indicating that UC frames are transmitted using multiple-input, multiple-output (MIMO), or orthogonal frequency-division multiple access (OFDMA) TX flow, which may be represented by formula (6) as follows:

$$\frac{SIFS+BlockACK}{MU\ \text{Group User Number}} \quad (6)$$

where SIFS may represent the time length for SIFS; BlockACK may represent the time length for receiving a block acknowledgement (BlockACK); and MU Group User Number may represent a number of users of a multi-user (MU) group in the case that using MIMO or OFDMA TX flow for multi-user.

In some example implementations, the AP MLD 102 may determine the second index using formula (7) as follows:

$$\frac{L_{non-UC}}{R_{non-UC}} \quad (7)$$

where $L_{non-UC}$ may represent the average length of BC or MC frames; and $R_{non-UC}$ may represent the lowest basic rate value for current clients on a link.

At block 308, the AP MLD 102 may determine if the first index is less than the second index. If the first index is less than or equal to the second index, the process 300 continues to block 310. If the first index is greater than the second index, the process 300 continues to block 312.

At block 310, the AP MLD 102 may trigger the DMO based on the comparison of the first index and the second index. For example, if the first index is less than the second index, the AP MLD is going to the perform the DMO on the link 120. If the first index is greater than or equal to the second index, the AP MLD will not perform the DMO on the link 120. At block 312, the AP MLD 102 may return to block 302.

In this way, it is assumed that a multicast packet is converted into unicast packets. Because the TX rate of a unicast packet is much higher than that of a multicast packet, if the sum of the TX times of all unicast packets is greater than that of the multicast packet, the DMO will be turned off. This will reduce the number of missed frames in MLSR cases and improve channel utilization. In some implementations, it can reduce broadcast or multicast latency. Otherwise, if the sum of the TX times of all unicast packets is less than that of the multicast packet, the DMO is turned on.

Figure 4:
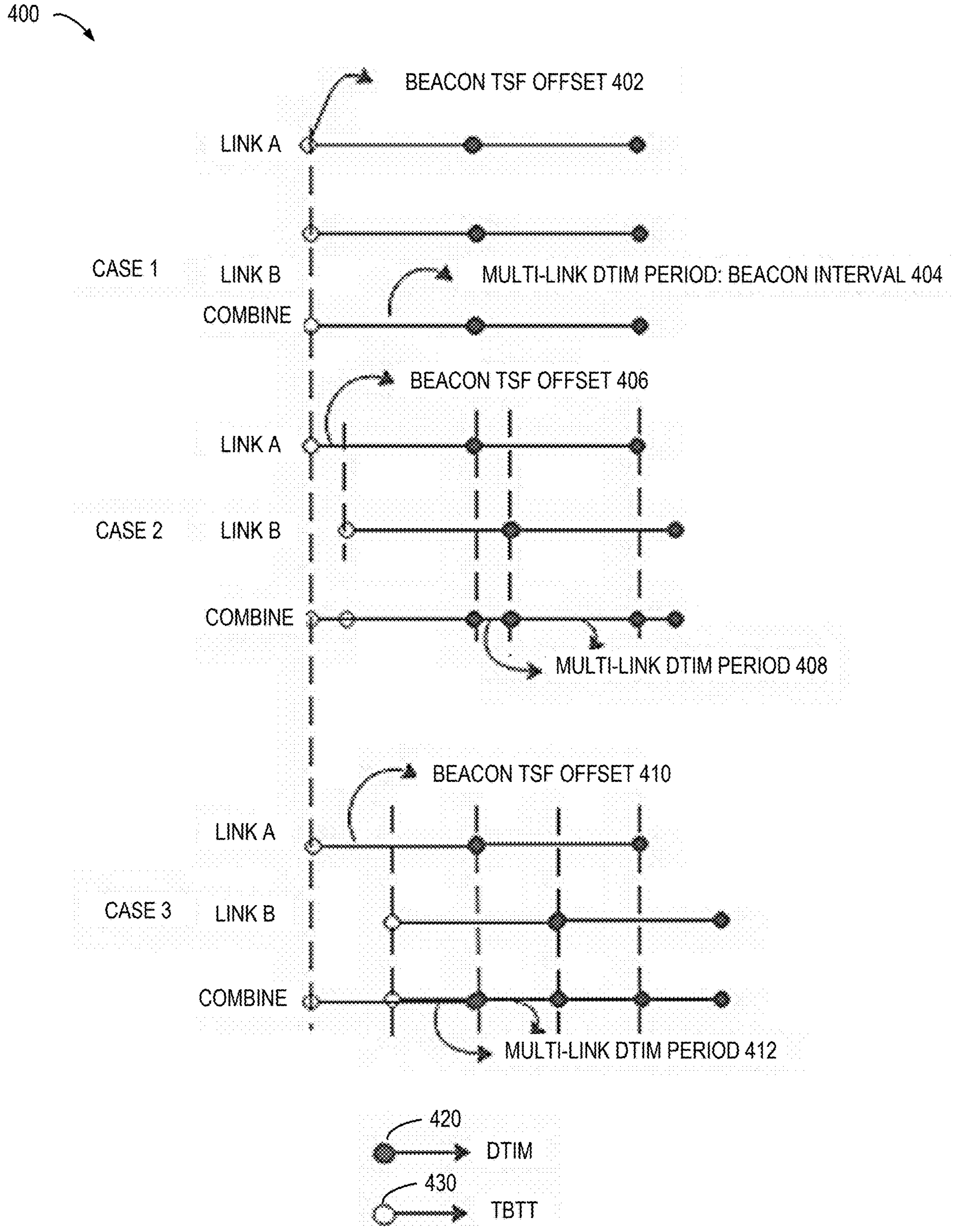
FIG. 4 illustrates an example illustration of three cases of different beacon timing synchronization function (TSF) offsets and different delivery traffic indication message (DTIM) periods according to implementations of the present disclosure.

Reference is made to FIG. 4, which illustrates an example illustration 400 of three cases of different beacon TSF offsets and different DTIM periods according to implementations of the present disclosure. As shown in FIG. 4, typically, the beacon interval is 100 milliseconds (ms). For case 1, case 2, and case 3, the beacon interval is 100 ms, and the DTIM period is 1 of link A and link B, the legend 420 represents a DTIM, and the legend 430 represents a target beacon transmission time (TBTT).

For some scenarios that are not suitable for DMO, for example, when the number of clients on each link is large. If assuming that latency dominates the condition, and ignores the BC or MC frame missing issue, the TSF offset of link's beacon can be adjusted to make BC or MC frames to be sent to STA MLD as soon as possible. Herein, the beacon TSF offset means that the beacon interval between links is Beacon TSF offset, and the multi-link DTIM period means that the DTIM interval between links is Multi-link DTIM period.

In case 1, the link A and the link B send the beacon frame at the same time. The Beacon TSF offset 402 is 0. The multi-link DTIM period 404 is the link's DTIM period. In case 2, the beacon TSF offset 406 is smaller than (beacon interval)/2, and the multi-link DTIM period 408 is the beacon TSF offset 406 or (beacon interval-beacon TSF offset 406). In case 3, the beacon TSF offset 410 is equal to (beacon interval)/2, and the multi-link DTIM period 412 is equal to beacon TSF offset 410.

If treating all links as one link, and referring to the combine line, it can be seen that in comparison of case 1, case 2, and case 3, there will be four DTIM times of all links in the three cases. However, in case 1, the DTIM time of the two links, A and B, arrive at the same time, which is equivalent to two DTIM times. in comparison to case 2 and case 3, the beacon TSF offset is different. It can be seen that the multi-link DTIM periods of case 2 are not equal. It cannot bring a balanced BC or MC transmitting. Therefore, the beacon TSF offset of case 3 is a better way to make BC or MC frames send to an STA MLD faster.

Figure 5:
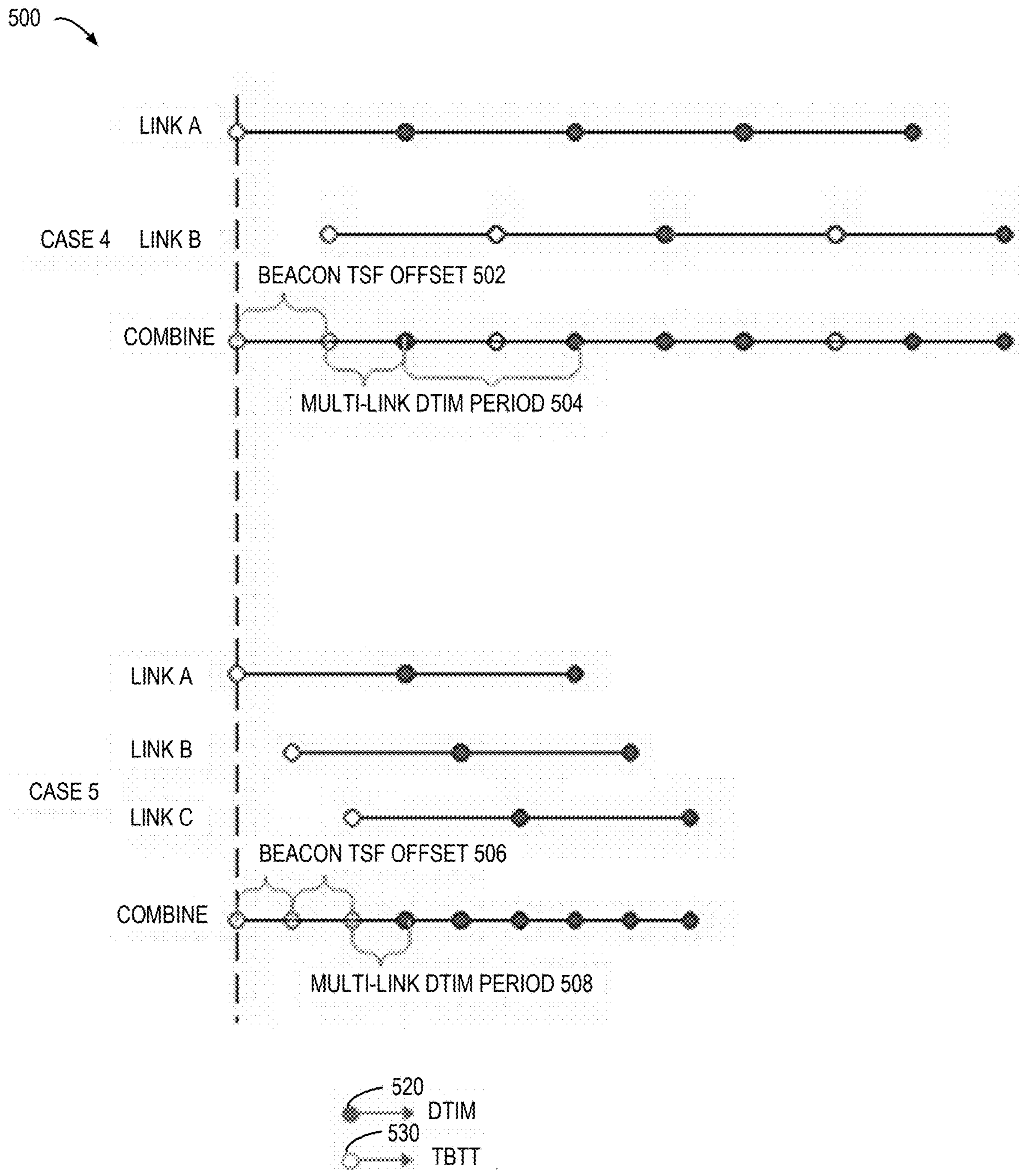
FIG. 5 illustrates another example illustration of two cases of different beacon TSF offsets and different DTIM periods according to implementations of the present disclosure.

Reference is made to FIG. 5, which illustrates an example illustration 500 of two cases of different beacon TSF offsets and different DTIM periods according to implementations of the present disclosure. As shown in FIG. 5, typically, the beacon interval is 100 ms. For case 4 and case 5, the beacon interval is 100 ms, and the DTIM period is 1 of link A and link B, the legend 520 represents a DTIM, and the legend 530 represents a target beacon transmission time (TBTT).

In case 4, it shows that shows that there are different DTIM periods between links. The DTIM period of Link A is 1, link B is 2, and the beacon TSF offset 502 is adjusted to be equal to (beacon interval)/2. The multi-link DTIM period 504 is equal to (beacon interval)/2 or equal to beacon interval. In case 5, it shows that the situation of three links, A, B, and C. The beacon TSF offset 506 is (beacon interval)/3, and the multi-link DTIM period 508 is (beacon interval)/3.

From FIG. 4 and FIG. 5, the beacon TSF offset of link n can be determined by the formula (8) as follows:

$$\frac{BI\cdot(n-1)}{n} \quad (8)$$

where n may represent the n-th links for an MLD. For example, AP MLD 102 has n links (n≤3); and BI may represent the beacon interval.

The average multi-link DTIM period can be determined by formula (9) as follows:

$$\frac{\text{MAX}(D1,\ \ldots\ ,D_n)\cdot BI}{\sum_{D=1}^{n}} \quad (9)$$

Where Dn may represent the DTIM periods for the link n; and $$\sum_{D=1}^{n}$$

may represent a sum of D1, . . . , Dn.

In summary, by adjusting the DTIM offset according to formula (8) and formula (9), it can make the BC or MC frames arrive at an STA MLD faster.

Figure 6:
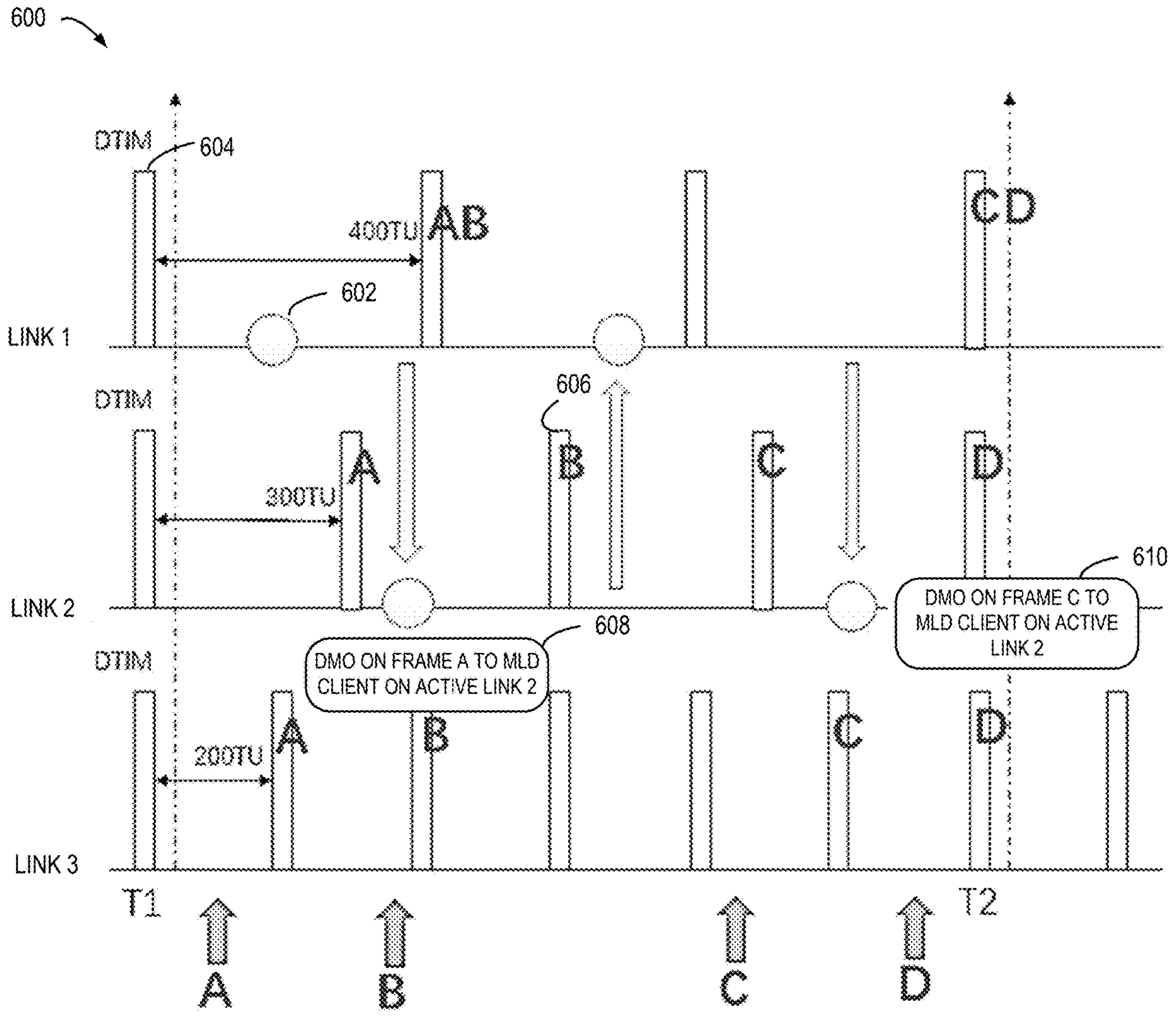
FIG. 6 illustrates an example illustration of a process of broadcast (BC) or multicast (MC) frames which are missing and a DMO usage for a multi-link single radio (MLSR) device according to implementations of the present disclosure.

Reference is made to FIG. 6, which illustrates an example illustration of a process 600 of BC or MC frames which are missing and a DMO usage for an MLSR device according to implementations of the present disclosure. FIG. 6 shows a way that can make sure the BC or MC frames to be received by all clients in an efficient way.

As shown in FIG. 6, DTIM periods for link 1, link 2, and link 3 are aligned, and all non-MLD clients can receive BC or MC frames on different links. MLD clients can receive the BC or MC frames if all links have sent DTIM at a certain time, for example, time points T1 and T2, as shown in FIG. 6. If there's no link switching or changing on any MLD clients, all MLD clients can also receive all the BC/MC frame on a specified link (for example, for one MLSR (also including EMLSR) client, it may use an active link to receive the frames).

Each link will not use formula (8) to leverage the DMO benefit for a single link usage only but will tune the DMO for the MLD link that has missed BC or MC frames. An AP MLD will maintain the missed BC or MC frames mask for each link. Therefore, there is a need to be concerned about the link switching or changing on MLD clients and a need to perform the DMO for the missed frame for the MLD client. The AP MLD may also use trigger frames, such as a request to send (RTS), to double-check if the latest active link is alive for this MLD on a link.

Further, the AP MLD may need to make the link of the MLSR device to be unchanged until the nearest DTIM transmission. For example, there's one MLSR client, for example, the circle 602 represents an active link for receiving. All BC or MC frames transmitted and received by all clients at T1, and new BC/MC traffic (frames A, B, C, and D) come from DS to Wi-Fi at different time points. First, the MLSR client stays on link 1, and it switches to link 2 before the frames A and B are sent at the DTIM 604 on link 1. Thus, the frame A is not received. Then the client will receive frame B at the DTIM 606 on link 2, and then it goes back to link 1. After the frame C comes to DS, it goes back to link 2, resulting in the frame C not being received. For the missed frames A and C, the AP MLD knows the active link for the MLSR client and will perform the DMO for the missed frames A and C for the MLD client on the active link at a proper time, for example, at block 608 and block 610. By implementing the process 600, it can make sure the BC or MC frames to be received by all clients in an efficient way.

Figure 7:
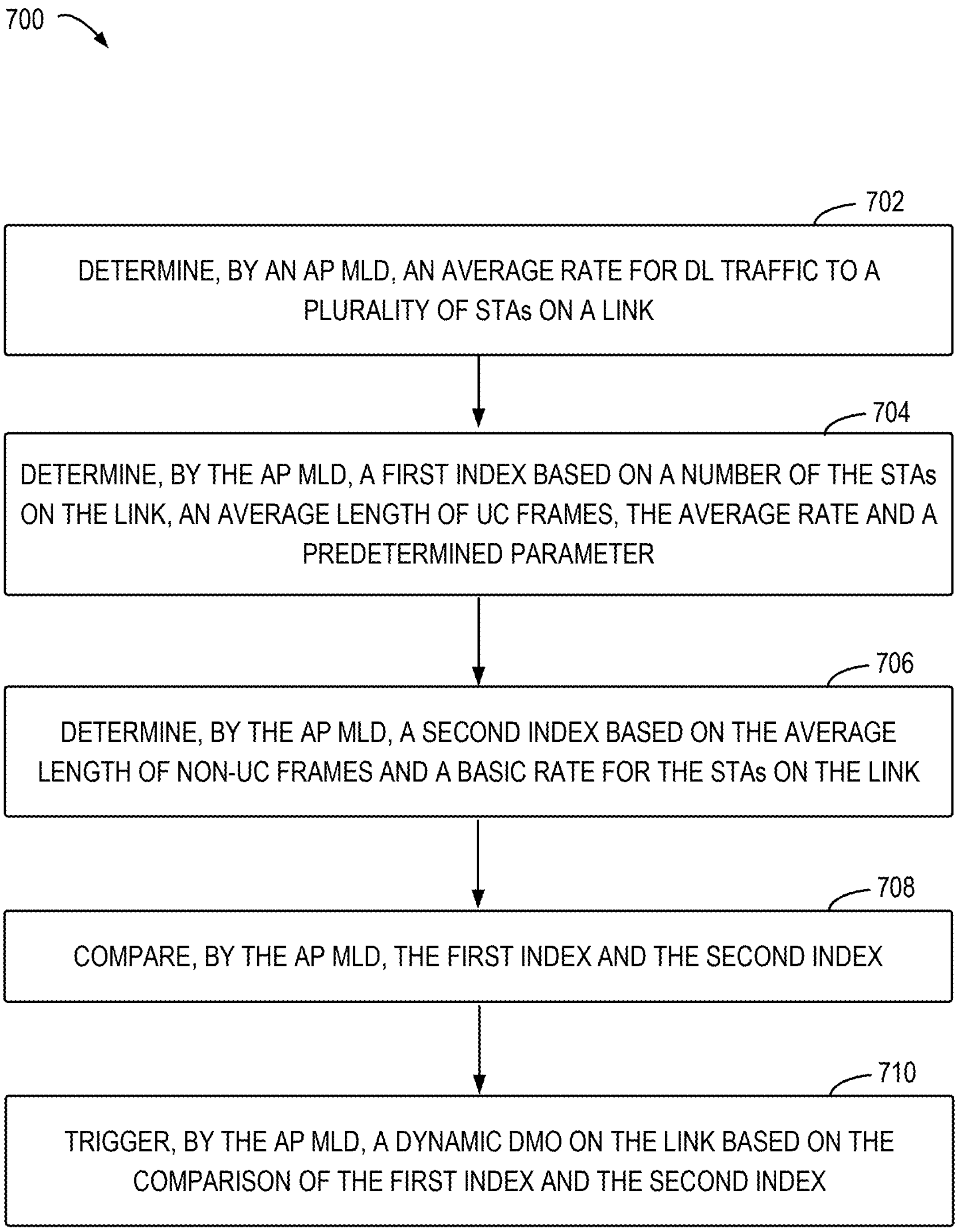
FIG. 7 illustrates an example flow chart of an example method for a switching mechanism for a DMO feature on a single link according to implementations of the present disclosure.

Reference is made to FIG. 7, which illustrates an example flow chart of an example method 700 for a switching mechanism for a DMO feature on a single link according to implementations of the present disclosure, and the method 700 may be performed by an access point such as the AP MLD 102. For clarity, reference will be made in combination with FIG. 1.

At 702, the AP MLD 102 determines an average rate for DL traffic to a plurality of STAs on a link. As an example, the AP MLD 102 may determine $R_{mean}$ using one of formulas (1) to (3).

At 704, the AP MLD 102 determines a first index based on a number of STAs on the link, an average length of non-UC frames, the average rate, and a predetermined parameter. In some example implementations, the predetermined parameter may be associated with a first amount of time indicating that UC frames are transmitted using SU TX flow. In some example implementations, the predetermined parameter may be associated with a second amount of time, indicating that UC frames are transmitted using MIMO or OFDMA TX flow. In some example implementations, the predetermined parameter may be associated with both the first amount of time and the second amount of time.

In some example implementations, the first index may be determined using formulas (4). In some example implementations, the first amount of time may be determined using formulas (5). In some example implementations, the second amount of time may be determined using formulas (6).

At 706, the AP MLD 102 determines a second index based on the average length of non-UC frames and a basic rate for STAs on the link. As an example, the AP MLD 102 may determine the second index using formulas (7).

At 708, the AP MLD 102 compares the first index and the second index. At 710, the AP MLD 102 triggers a DMO on the link based on the comparison of the first index and the second index. As an example, if the first index is less than the second index, the AP MLD 102 may perform the DMO. If the first index is greater than or equal to the second index, the AP MLD 102 will not perform the DMO.

According to implementations of the present disclosure, it uses a mathematical model to estimate a TX rate in the case that a multicast packet is converted into unicast packets. Because the TX rate of a unicast packet is much higher than that of a multicast packet, if the sum of the TX times of all unicast packets is greater than that of the multicast packet, the DMO will be turned off. This will reduce the number of missed frames in MLSR cases and improve channel utilization. In some implementations, it can reduce broadcast or multicast latency. In some implementations, it can reduce the number of missed frames for multi-link single radio (MLSR) cases and reduce broadcast or multicast latency.

Figure 8:
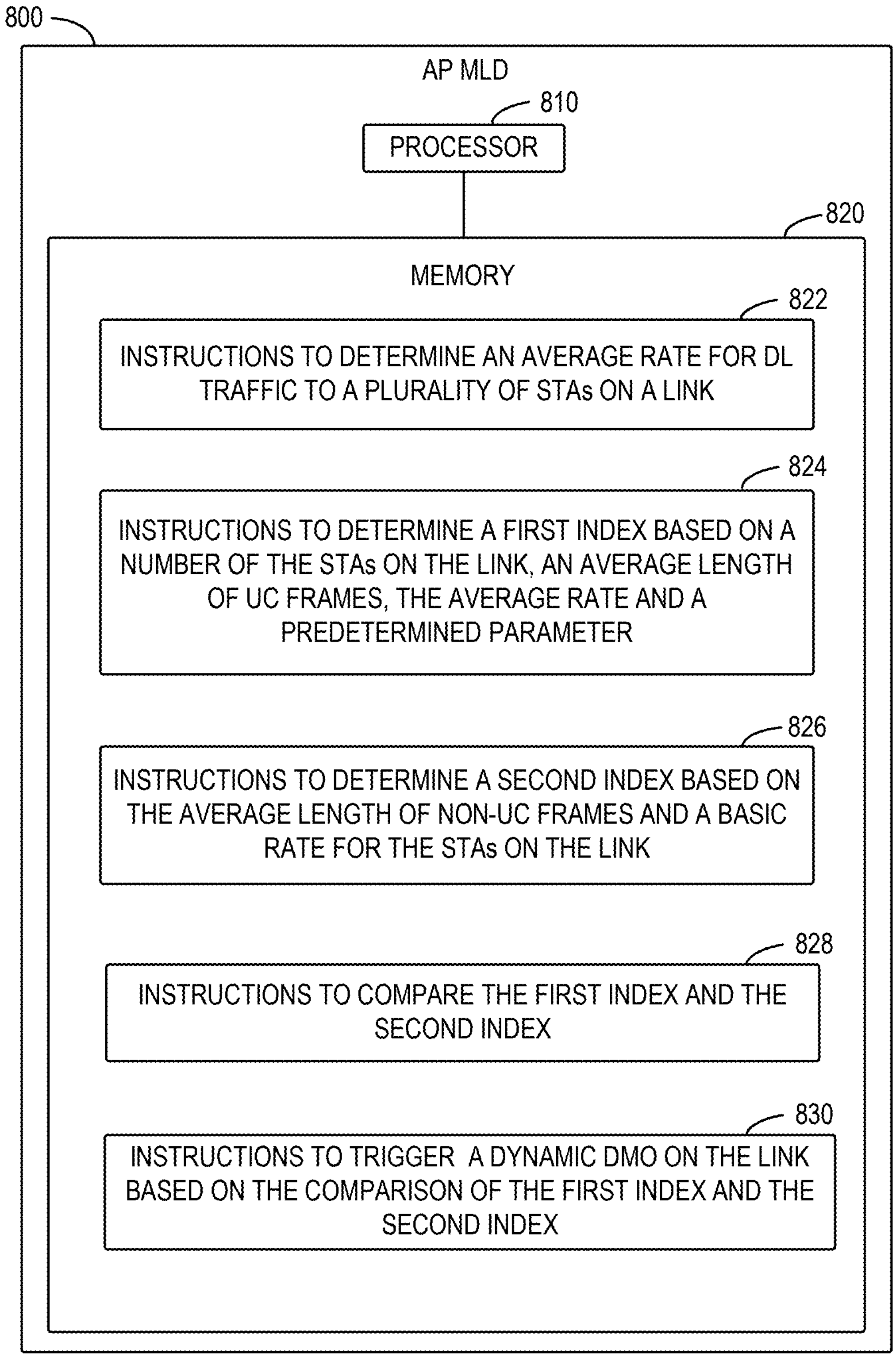
FIG. 8 illustrates an example AP MLD according to implementations of the present disclosure.

Reference is made to FIG. 8, which illustrates an example AP MLD 800 according to implementations of the present disclosure. As shown in FIG. 8, the AP MLD 800 comprises at least one processor 810, and a memory 820 coupled to the at least one processor 810. The memory 820 stores instructions 822, 824, 826, 828, and 830 to cause the processor 810 to perform actions according to example implementations of the present disclosure. As shown in FIG. 8, the memory 820 stores instructions 822 to determine an average rate for DL traffic to a plurality of STAs on a link. The memory 820 further stores instructions 824 to determine a first index based on a number of the STAs on the link, an average length of non-UC frames, the average rate, and a predetermined parameter, wherein the predetermined parameter is associated with at least one of a first amount of time indicating that UC frames are transmitted using SU TX flow, or a second amount of time indicating that UC frames are transmitted using MIMO or OFDMA TX flow.

The memory 820 further stores instructions 826 to determine a second index based on the average length of non-UC frames and a basic rate for the STAs on the link. The memory 820 further stores instructions 828 to compare the first index and the second index. The memory 820 further stores instructions 830 to trigger a DMO on the link based on the comparison of the first index and the second index. The stored instructions and the functions that the instructions may perform can be understood with reference to the description of FIGS. 2-7. For the purpose of simplification, the details of instructions 822, 824, 826, 828, and 830 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

determining, by an access point (AP) multi-link device (MLD), an average rate for downlink (DL) traffic to a plurality of stations (STAs) on a link;

determining, by the AP MLD, a first index based on a number of the STAs on the link, an average length of non-unicast (UC) frames, the average rate and a predetermined parameter, wherein the predetermined parameter is associated with at least one of a first amount of time indicating that UC frames are transmitted using single user (SU) transmission (TX) flow, or a second amount of time indicating that UC frames are transmitted using multiple-input, multiple-output (MIMO) or orthogonal frequency-division multiple access (OFDMA) TX flow;

determining, by the AP MLD, a second index based on the average length of non-UC frames and a basic rate for the STAs on the link;

comparing, by the AP MLD, the first index and the second index; and triggering, by the AP MLD, a dynamic multicast optimization (DMO) on the link based on the comparison of the first index and the second index, wherein triggering the DMO further comprises in response to the first index is less than or equal to the second index, performing, by the AP MLD, the DMO.

2. The method of claim 1, wherein the average rate comprises one of an arithmetic mean, a geometric mean or a harmonic mean determined based on a plurality of rates associated with the STAs and the number of the STAs.

3. The method of claim 1, wherein determining the first index comprises:

determining, by the AP MLD, a first proportion based on the average length of UC frames and the average rate;

determining, by the AP MLD, a first sum of the first proportion and the predetermined parameter;

determining, by the AP MLD, a product based on the first proportion and the first sum; and determining, by the AP MLD, the product as the first index.

4. The method of claim 1, wherein determining the second index comprises:

determining, by the AP MLD, a second proportion based on the average length of non-UC frames and the basic rate; and determining, by the AP MLD, the second proportion as the second index.

5. The method of claim 1, wherein the first amount of time comprises:

a second sum of short inter frame space (SIFS) and a time length for receiving an acknowledgement (ACK).

6. The method of claim 1, wherein the second amount of time is determined based on the following:

determining, by the AP MLD, a third sum of short inter frame space (SIFS) and a time length for receiving a block ACK; and determining, by the AP MLD, a third proportion based on the third sum and a number of users of a multi-user (MU) group.

7. The method of claim 1, further comprising:

determining, by the AP MLD, a beacon timing synchronization function (TSF) offset based on a number of a plurality of links of the AP MLD and a beacon interval between the links.

8. The method of claim 7, further comprising:

determining, by the AP MLD, an average delivery traffic indication message (DTIM) period based on the beacon interval, a maximum DTIM period of a plurality of DTIM periods for the links and a sum of the DTIM periods, wherein a DTIM period of the DTIM period is associated with the beacon TSF offset.

9. The method of claim 1, wherein in response to the AP MLD is a multi-link single radio (MLSR) device and the link is an active link for transmitting a UC frame, the method further comprises:

detecting, by the AP MLD, that the UC frame is missing for the STA on the active link; and performing, by the AP MLD, the DMO for the UC frame on the active link.

10. The method of claim 9, further comprising:

transmitting, by the AP MLD, a request to send (RTS) frame to determine whether the active link is still alive for the STA; and in response to receiving a response to the RTS frame, determining that the active link is still alive.

11. An access point (AP) multi-link device (MLD) comprising:

at least one processor; and a memory coupled to the at least one processor, the memory storing instructions to cause the at least one processor to:

determine an average rate for downlink (DL) traffic to a plurality of stations (STAs) on a link;

determine a first index based on a number of the STAs on the link, an average length of non-unicast (UC) frames, the average rate and a predetermined parameter, wherein the predetermined parameter is associated with at least one of a first amount of time indicating that UC frames are transmitted using single user (SU) transmission (TX) flow, or a second amount of time indicating that UC frames are transmitted using multiple-input, multiple-output (MIMO) or orthogonal frequency-division multiple access (OFDMA) TX flow;

wherein the first amount of time comprises a second sum of short inter frame space (SIFS) and a time length for receiving an acknowledgement (ACK), and wherein the AP MLD further comprises instructions to cause the at least one processor to determine the second amount of time:

determine a third sum of short inter frame space (SIFS) and a time length for receiving a block ACK; and determine a third proportion based on the third sum and a number of users of a multi-user (MU) group;

determine a second index based on the average length of non-UC frames and a basic rate for the STAs on the link;

compare the first index and the second index; and trigger a dynamic multicast optimization (DMO) on the link based on the comparison of the first index and the second index.

12. The AP MLD of claim 11, wherein the average rate comprises one of an arithmetic mean, a geometric mean or a harmonic mean determined based on a plurality of rates associated with the STAs and the number of the STAs.

13. The AP MLD of claim 11, wherein the instructions to determine the first index comprise instructions to cause the at least one processor to:

determine a first proportion based on the average length of UC frames and the average rate;

determine a first sum of the first proportion and the predetermined parameter;

determine a product based on the first proportion and the first sum; and determine the product as the first index.

14. The AP MLD of claim 11, wherein the instructions to determine the second index comprise instructions to cause the at least one processor to:

determine a second proportion based on the average length of non-UC frames and the basic rate; and determine the second proportion as the second index.

15. The AP MLD of claim 11, wherein the instructions to trigger the DMO on the link based on the comparison comprise instructions to cause the at least one processor to:

in response to the first index is less than or equal to the second index, perform the DMO.

16. The AP MLD of claim 11, further comprising instructions to cause the at least one processor to:

determine a beacon timing synchronization function (TSF) offset based on a number of a plurality of links of the AP MLD and a beacon interval between the links; and determine an average delivery traffic indication message (DTIM) period based on the beacon interval, a maximum DTIM period of a plurality of DTIM periods for the links and a sum of the DTIM periods, wherein a DTIM period of the DTIM period is associated with the beacon TSF offset.

17. The AP MLD of claim 11, wherein in response to the AP MLD is a multi-link single radio (MLSR) device and the link is an active link for transmitting a UC frame, and wherein the AP MLD further comprises instructions to cause the at least one processor to:

detect that the UC frame is missing for the STA on the active link;

perform the DMO for the UC frame on the active link; and transmit, a request to send (RTS) frame to determine whether the active link is still alive for the STA.

18. A non-transitory computer-readable medium comprising instructions stored thereon which, when executed by an access point (AP) multi-link device (MLD), cause the AP MLD to:

determine an average rate for downlink (DL) traffic to a plurality of stations (STAs) on a link;

determine a first index based on a number of the STAs on the link, an average length of non-unicast (UC) frames, the average rate and a predetermined parameter, wherein the predetermined parameter is associated with at least one of a first amount of time indicating that UC frames are transmitted using single user (SU) transmission (TX) flow, or a second amount of time indicating that UC frames are transmitted using multiple-input, multiple-output (MIMO) or orthogonal frequency-division multiple access (OFDMA) TX flow;

determine a second index based on the average length of non-UC frames and a basic rate for the STAs on the link, wherein determining the second index comprises causing the AP MLD to:

determine a second proportion based on the average length of non-UC frames and the basic rate; and determine the second proportion as the second index;

compare the first index and the second index; and trigger a dynamic multicast optimization (DMO) on the link based on the comparison of the first index and the second index.

* * * * *